United States Patent [19]

Kandarian

[11] Patent Number: 4,826,367
[45] Date of Patent: May 2, 1989

[54] CUTTING TOOL ASSEMBLY

[75] Inventor: Richard Kandarian, Birmingham, Mich.

[73] Assignee: Michigan Drill Corporation, Troy, Mich.

[21] Appl. No.: 45,899

[22] Filed: May 4, 1987

[51] Int. Cl.⁴ .................................... B27G 15/00
[52] U.S. Cl. .......................... 408/225; 408/189; 407/8; 407/51; 30/300
[58] Field of Search ............... 30/276, 300, 303, 301, 30/320, 321, 338, 339, 500, 435–442; 408/84, 186, 189, 190, 196, 200, 201, 213, 225, 191–195; 144/24, 150; 82/24 A, 1.2, 1.4; 407/8, 9, 33, 34, 51

[56] References Cited

U.S. PATENT DOCUMENTS

| 963,468 | 7/1910 | Pastore | 408/213 X |
|---|---|---|---|
| 1,241,018 | 9/1917 | Rawles | 408/190 X |
| 1,301,875 | 4/1919 | Prosser | 30/300 |
| 1,354,848 | 10/1920 | Schilling et al. | 408/196 X |
| 1,746,463 | 2/1930 | Elder | 30/300 |
| 2,269,320 | 1/1942 | Rosborough | 82/24 A X |
| 2,937,545 | 5/1960 | Rauer et al. | 77/58 |
| 2,943,383 | 7/1960 | Anthony et al. | 407/8 |
| 3,994,194 | 11/1976 | Moceri | 408/189 X |
| 4,675,975 | 6/1987 | Kucharczyk et al. | 407/34 X |

Primary Examiner—Frank T. Yost
Assistant Examiner—Michael D. Folkerts
Attorney, Agent, or Firm—Krass & Young

[57] ABSTRACT

A cutting tool assembly of the type including a pilot holder and a cutter blade received in a transverse through slot in the pilot holder. The cutter blade is mounted in the transverse slot in the pilot holder in a manner to allow ready replacement of the pilot blade and in a manner to allow the cutter blade to self-align with respect to the central axis of the pilot holder to minimize the stress loading in the cutter blade and minimize blade breakage. In one embodiment, the cutter blade is mounted in the pilot holder by a cartridge which is received in a threaded bore in the pilot portion of the pilot holder and which includes a spring biased pin projecting upwardly into the transverse slot in the pilot holder. In another embodiment, the cutter blade is mounted in the transverse slot in the pilot holder by a pin and slot connection provided by a slot in the blade and a pin passing through the pilot holder.

10 Claims, 3 Drawing Sheets

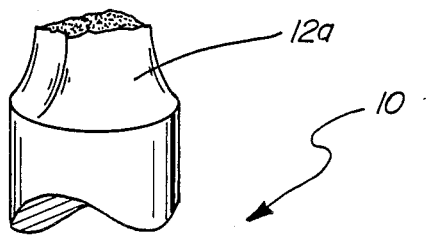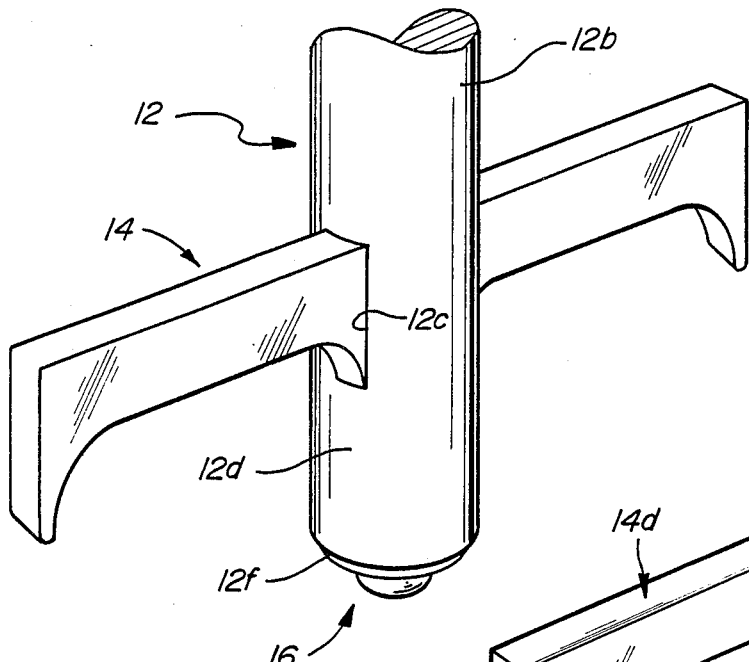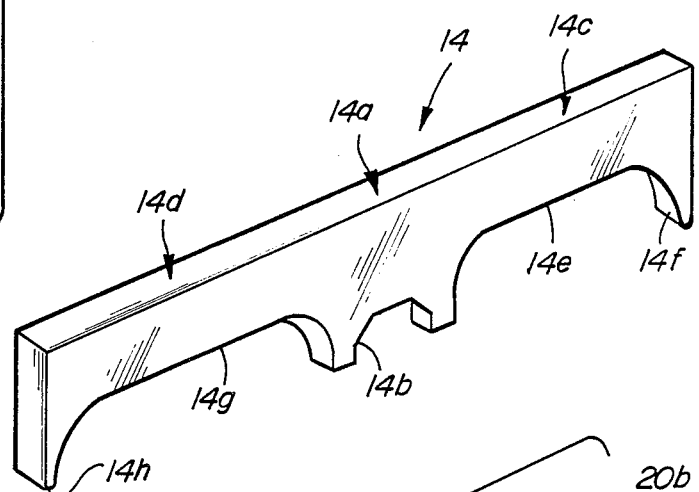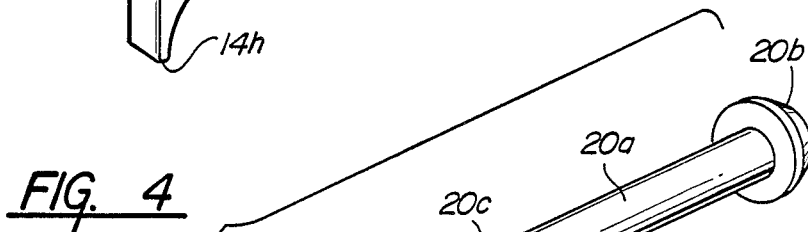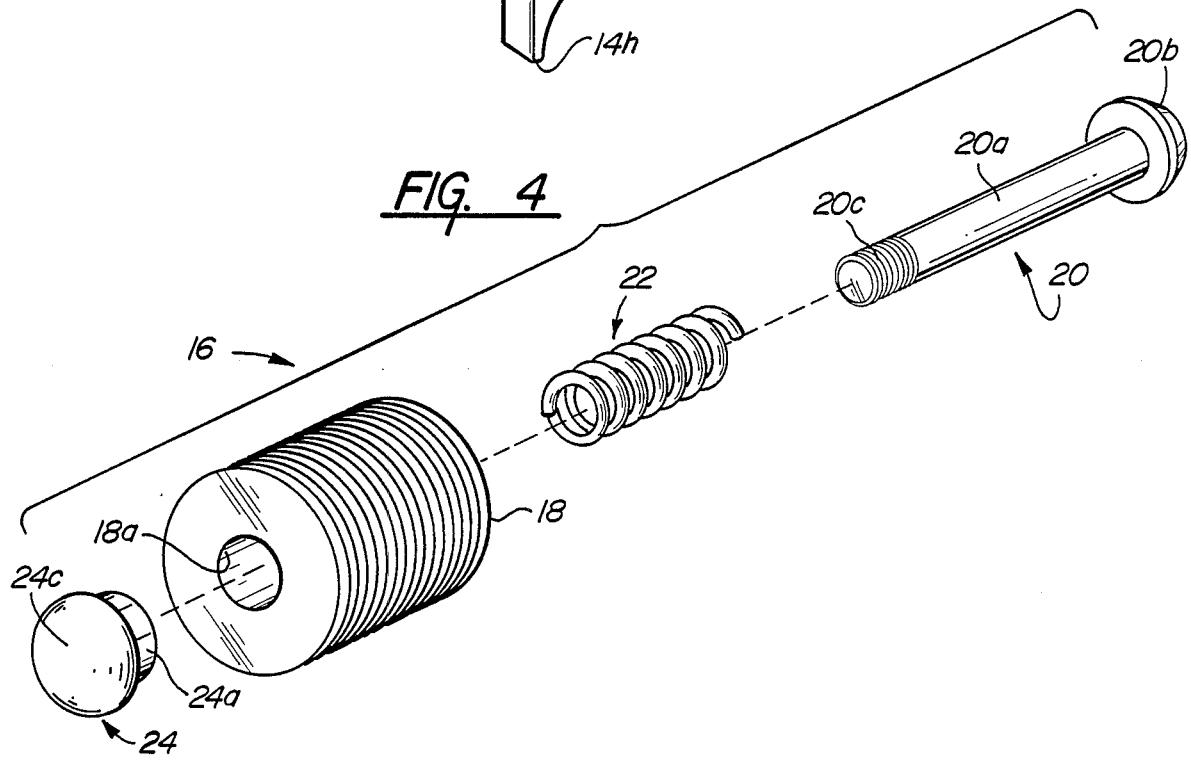

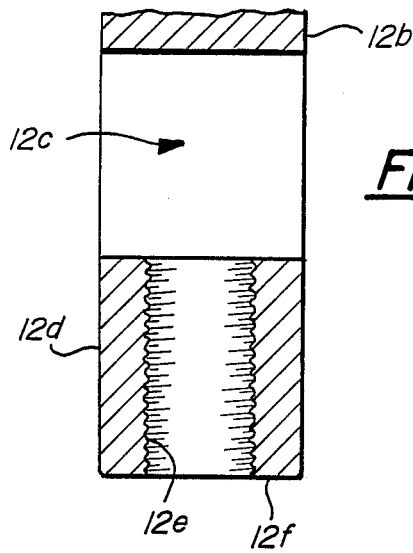
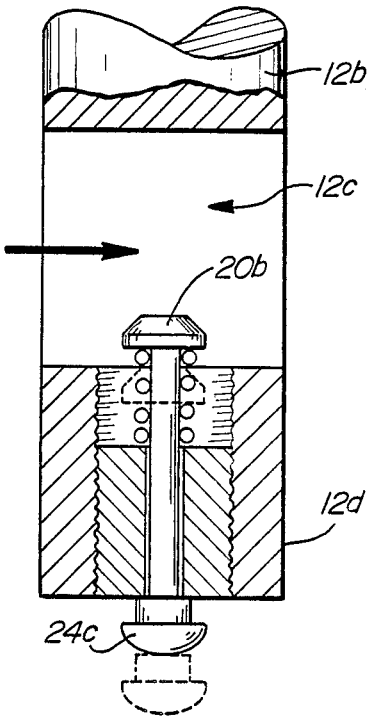
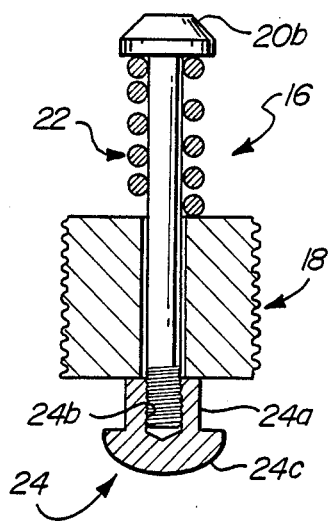
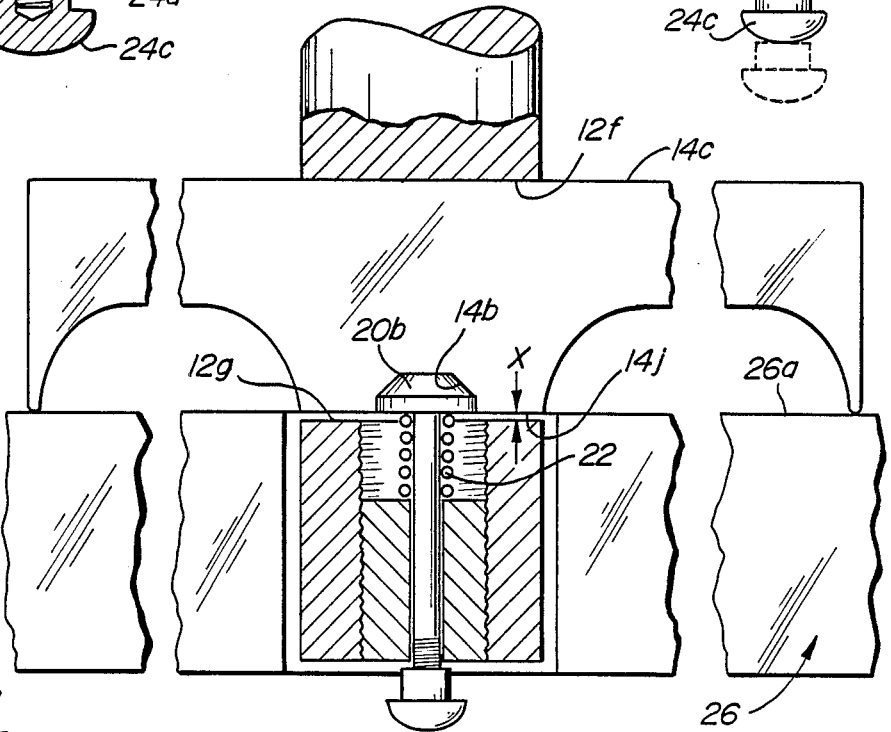

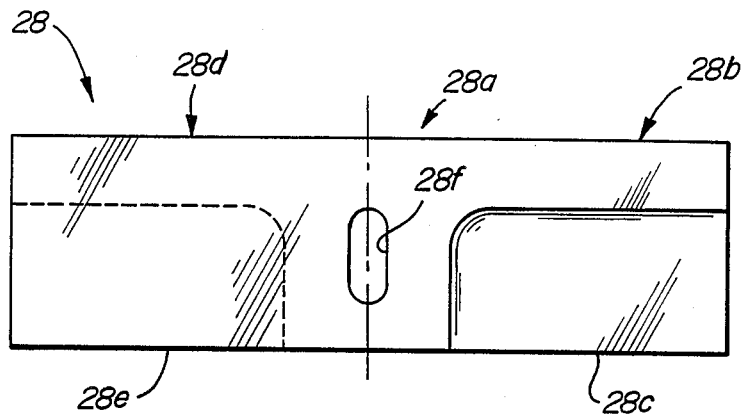
FIG. 8
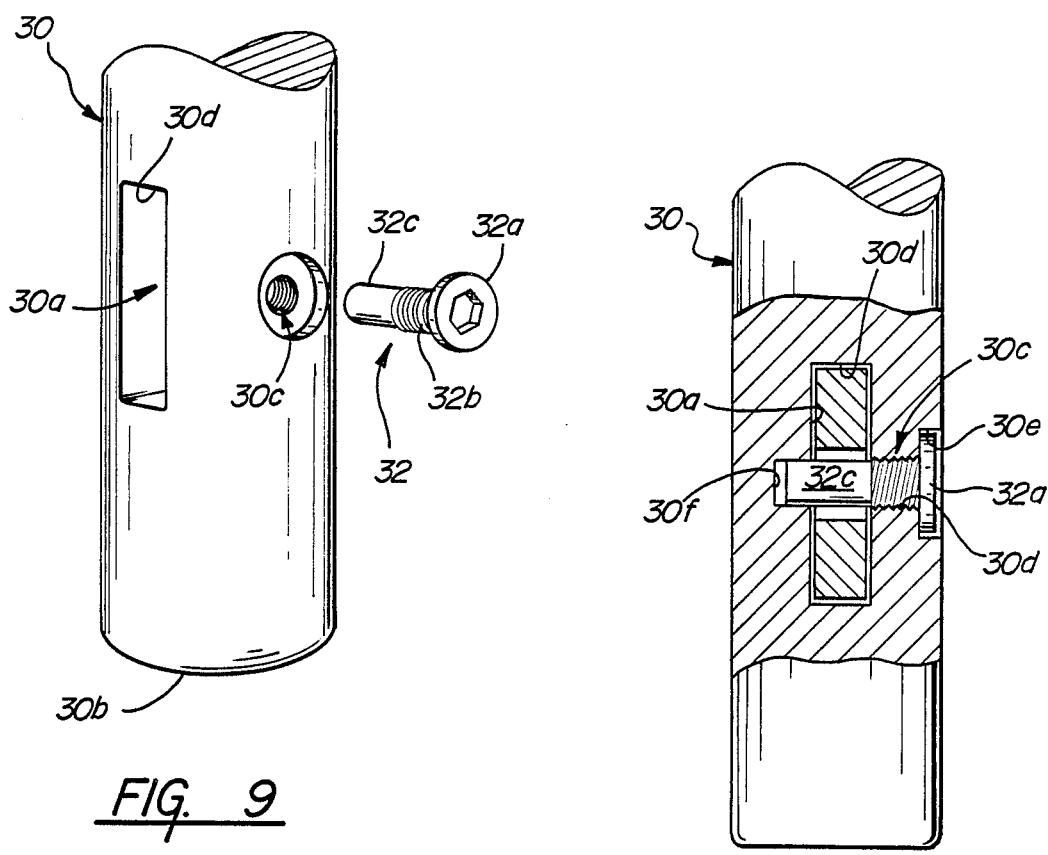
FIG. 9
FIG. 10

4,826,367

CUTTING TOOL ASSEMBLY

BACKGROUND OF THE INVENTION

This invention related to cutting tool assemblies and, more particularly, to a cutting tool assembly of the type including a pilot holder and a cutting blade positioned transversely in a transverse slot in the pilot holder.

Cutting tool assemblies of this type have the advantage of allowing relatively large diameter holes to be cut in metal plate members using relatively low power equipment. However, since the blades are typically held in position in the pilot hole by a set screw, removal and replacement of the blades is awkward and time consuming. Further, since the blades are typically held in a rigid position relative to the pilot holder by the set screw, high stress loads are generated in one or the other of the cutting edges of the blade when uneven surfaces are present in the plate member or when alignment of the plate member is not true with respect to the central axis of the pilot holder, with the result in either case that the blades are subject to frequent breakage.

SUMMARY OF THE INVENTION

This invention is directed to the provision of improved cutting tool assembly of the type including a pilot holder and a cutter blade mounted in a transverse slot in the pilot holder.

More specifically, this invention is directed to the provision of a cutting tool assembly of the pilot holder and cutting blade type in which cutter blade breakage is minimized.

Further, this invention is directed to the provision of a cutting tool assembly of the pilot holder and cutting bade type in which the cutter blades may be readily and quickly interchanged.

In the cutting tool assembly of the invention, the cutter blade is mounted in the transverse slot in the pilot holder in a manner to allow translatory and rotational movement of the cutter blade relative to the holder. This arrangement allows the cutter blade to accommodate to uneven surfaces in the material being cut or to lack of alignment as between the pilot holder and the material so as to minimize stresses in the cutter blade and thereby minimize cutter blade breakage.

According to a further feature of the invention, the blade mounting means includes a mounting member movable between a retracted position which is clear of the slot in the pilot holder to allow removal and replacement of the blade and a working position in which it mounts the blade in the slot for translatory and rotational movement relative to the holder. This arrangement allows the blades to be readily and quickly interchanged and provides the desired rotational and translatory freedom for the blade in its mounted disposition to minimize blade breakage.

According to a further feature of the invention, the mounting means further includes a notch in the lower side of the blade, and the mounting member comprises a spring loaded axially displaceable pin carried by the pilot holder and including a head portion projecting into the slot in the working position of the pin and sized to seat in the notch. This arrangement allows ready replacement of the blade, mounts the blade securely in the pilot holder, and allows the blade in its mounted condition to undergo limited rotational and translatory movement in the slot relative to the pilot holder to accommodate the uneven surfaces in the workpiece being cut or misalignment as between the pilot holder and the workpiece.

According to a further feature of the invention, the pin is positioned in the pilot portion of the pilot holder and the head portion projects upwardly into the slot in the working position of the pin. This arrangement provides a convenient and effective means of providing the desired quick interchangeability and the desired rotational and translatory mounting for the blade.

According to a further feature of the invention, the pilot portion includes a central bore opening at its upper end in the transverse slot and at its lower end in the lower end of the pilot portion, and the pin comprises a component of a cartridge unit adapted to be positioned in the central bore of the pilot portion with the head portion of the pin projecting upwardly into the slot in the working position of the pin. This arrangement allows a preassembled cartridge unit to be moved upwardly into the bore in the pilot portion and into position relative to the transverse slot in the pilot hold so as to readily provide the desired quick interchangeability and the desired rotational and translatory freedoms of movement for the cutter blade.

According to a further feature of the invention, the cartridge further includes a plug sized to fit in the bore of the pilot portion and including a central bore selectively passing the pin, a coil spring positioned around the pin between the head portion of the pin and the plug, and a radially enlarged member secured to the lower end of the pin below the plug. This arrangement provides a pin which resiliently yields downwardly to allow insertion of a cutter blade into the transverse slot in the pilot holder and seating of the head portion of the pin in the notch in the cutter blade and which thereafter functions to allow resiliently resisted limited rotational and translatory movement of the cutter blade in the slot to accommodate uneven work surfaces or conditions of misalignment.

According to a further feature of the invention, the radially enlarged portion is formed as a knob to facilitate grasping of the lower end of the pin to pull the pin downwardly against the bias of the spring to allow ready insertion of the cutter blade into the transverse slot.

BRIEF DESCRIPTION OF THE DRAWINGS

FIG. 1 is a perspective view of a cutting tool assembly according to the invention;

FIG. 2 is a perspective view of the cutter blade of the cutting tool assembly of FIG. 1;

FIG. 3 is a fragmentary view of the pilot holder of the cutting assembly of FIG. 1;

FIG. 4 is an exploded view of a cartridge unit utilized to mount the cutter blade in the pilot holder;

FIG. 5 is a cross-sectional assembled view of the mounting cartridge unit;

FIG. 6 is a fragmentary view showing the manner in which the cutter blade is inserted into the pilot holder of the cutting tool assembly;

FIG. 7 is a fragmentary view showing the mounting disposition of the cutter blade in the pilot holder;

FIG. 8 is a view of a cutter blade utilized in a modified form of the invention;

FIG. 9 is a fragmentary perspective view of a pilot holder for use with the cutter blade of FIG. 8; and FIG. 10 is a fragmentary view showing the manner in which the cutter blade of FIG. 8 is mounted in the pilot holder of FIG. 9.

DETAILED DESCRIPTION OF THE PREFERRED EMBODIMENTS

The cutting tool assembly seen generally at 10 in FIG. 1 includes a pilot holder 12, a cutter blade 14, and a mounting cartridge 16.

Pilot holder 12 is formed of a suitable steel bar stock and includes an upper attachment portion 12a for removable receipt in a chuck, a shank portion 12b below attachment portion 12a and including a transverse through slot 12c, and a lower pilot portion 12d below the shank portion and including a central threaded axial bore 12e opening at its upper end in transverse slot 12c and at its lower end in the lower end 12f of the pilot portion.

Cutter blade 14 is formed of a suitable flat bar of tool steel having a thickness slightly less than the thickness of slot 12c and an effective vertical height somewhat less than the vertical height of slot 12c. Cutter blade 14 includes a central attachment portion 14a extending the full height of the cutter blade and including a notch 14b in the lower transverse edge thereof having a generally truncated pyramidal configuration, a right cutting portion 14c extending to one side of the central attachment portion, and a left cutting portion 14d extending to the other side of the central attachment portion. The lower side of cutting portion 14c is relieved at 14e to define a peripheral cutting edge 14f and the lower side of cutting portion 14d is similarly relieved at 14g to define a peripheral cutting edge 14h. The peripheral edge portions of the cutter blade defining the peripheral cutting edges 14f and 14h extend for the full height of the cutter blade and therefore have a height that corresponds generally to the height of attachment portion 14a and is somewhat less than the vertical height of the slot 12c.

Mounting cartridge 16 includes a plug 18, a pin 20, a spring 22, and a knob 24. Plug 18 is sized to fit threadably in the threaded central bore 12e of the pilot portion of the pilot holder and includes a central bore 18a.

Pin 20 includes a shank portion 20a sized to pass slidably through plug bore 18a, an enlarged head portion 20b of frustoconical configuration generally conforming to the configuration of blade notch 14b, and a lower threaded portion 20c.

Spring 22 is a coil spring and fits telescopically over shank portion 20a of pin 20.

Knob 24 includes a hub portion 24a defining a blind central bore 24b threadably receiving the lower end 20c of pin 20, and a grasping or handle portion 24c.

In the assembled relation of the parts, as best seen in FIGS. 6 and 7, mounting cartridge 16 is mounted in pilot portion 12d of the pilot holder with plug 18 threadably received in threaded bore 12e, knob 24 threadably secured to the lower end of pin 20, and pin 20 projecting upwardly through plug central bore 18a under the urging of coil spring 22 to position head portion 20b within the transverse slot 12c in the pilot holder.

When it is desired to insert a cutter blade 14 into transverse slot 12c, knob 24 is grasped to pull pin 20 downwardly against the resistance of spring 22 from the solid line working position of FIG. 6 to the dotted line retracted position of FIG. 6 in which the head portion 20b of the pin clears slot 12c so as to allow blade 14 to be inserted transversely through the slot to bring notch 14b of central attachment portion 14a in vertical alignment with head portion 20b, whereafter knob 24 may be released to allow pin 20 to move upwardly under the urging of spring 22 and move head portion 20b into notch 14b. The mounted disposition of the cutter blade within the transverse slot of the pilot holder is seen in FIG. 7 wherein spring 22 urges pin head portion 20b upwardly to urge the upper transverse edge 14i of the cutter blade against the upper transverse edge 12f of the pilot holder transverse slot 12c. Since the vertical height of the attachment portion 14a of the cutter blade is somewhat less than the vertical height of the transverse slot 12c, a clearance, seen at X in FIG. 7, is provided between the lower transverse edge 14j of the cutter blade attachment portion and the lower transverse edge 12g of the transverse slot. This clearance X allows the cutter blade to move rotationally and in a translatory manner relative to the pilot holder against the resistance of spring 22 so that, if the cutting edges 14h and 14f move into cutting engagement with the upper surface 26a of a metal plate member 26 to be cut at different times due to irregularities or unevenness in the surface 26a, or due to the central axis of the pilot holder not being true with respect to the plane of the surface 26a, the blade may cock to compensate for the unevenness or the lack of alignment with the cocking being accomplished by selective rotational and translatory movement of the cutter blade within the slot 12c. This cocking or self-aligning action is instantaneous and short-lived since the cutting edges at 14f and 14h, as they cut a circular groove in the upper face of the plate member, quickly reassume a position in which they occupy the same plane normal to the central axis of the pilot holder and the upper edge 14i of the cutter blade quickly reassumes its position in total, flat abutting engagement with the upper surface 12f of the slot in the pilot holder so that the cutter blade is held in its true position relative to the central axis of the pilot holder as the pilot holder continues to advance downwardly to allow the cutting edges 14f and 14h to continue to advance into the upper surface 26a of the plate member. The amount of cocking or self-aligning action allowed as between the pilot holder and the cutter blade will of course vary depending upon the difference in the vertical height of the central attachment portion of the cutter blade as compared to the vertical height of the transverse slot 12c. Satisfactory results may be obtained for typical operations by the use of a transverse slot having a vertical height of 1 inch and a cutter blade having a vertical height of 0.885 inches at the attachment portion.

A modified form of the invention cutting tool assembly is seen in FIGS. 8–10. In the cutting tool assembly of FIGS. 8–10, the cutter blade 28 is formed of flat steel bar stock and includes a central attachment portion 28a, a right cutting portion 28b having a cutting edge 28c along the lower front transverse edge of the cutter blade, and a left cutting portion 28d having a cutting edge 28e formed along the lower rear transverse edge of the cutter blade. A vertically extending slot 28f is provided in attachment portion 28a on the center line of the blade.

Pilot holder 30 includes a transverse slot 30a extending through the pilot holder at a location spaced upwardly from the lower end 30b of the pilot holder, and a bore 30c extending transversely with respect to slot 30a and including a threaded portion 30d, a counterbore portion 30e, and a blind journal portion 30f.

The cutting tool assembly of the FIGS. 8–10 embodiment further includes a mounting pin 32, including a head portion 32a, a threaded portion 32b, and a shank portion 32c. In the assembled relation of the parts, blade 28 is mounted transversely in slot 30a and mounting pin 32 is received in pilot holder bore 30c with shank portion 32c passing through slot 28f and journalling in blind journal portion 30f, threaded portion 32b threadably engaging threaded bore portion 30d, and head portion 32a seated in counterbore 30e. In this embodiment, the combined rotational and translatory movement of the cutter blade within the transverse slot 30a is provided by the pin and slot connection as between pin 32 and slot 28f. Specifically, the diameter of shank portion 32c approximates the diameter of slot 28f so that the blade may pivot about the axis of pin 32, and slot 28f has a vertical height sufficient to allow translatory movement of the blade along the pin, in the event that the cutting edges 28c and 28e encounter uneven or irregular surfaces in the upper surface of the plate member being cut into or in the event that the central axis of the pilot holder is not true with respect to the upper surface of the plate member. As with the embodiment of FIGS. 1–7, the cocking or self-aligning movement of the cutter blade is instantaneous and the blade quickly moves into a position in which the transverse upper edge of the blade is firmly and totally abutted against the upper transverse edge 30d of transverse slot 30a. As with the embodiment of FIGS. 1–7, the ability of the blade to self-align in response to uneven surfaces in the workpiece or in response to conditions of misalignment reduces the blade stress and minimizes the blade breakage that might otherwise occur if the blade were not allowed to cock and self-align with respect to the pilot holder.

To change blades in the FIGS. 8–10 embodiment, mounting pin 32 need only be backed out an amount to clear shank portion 32c from slot 28f, whereupon the old cutter blade 28 may be removed, a new blade inserted, and the mounting pin again threadably advanced to reposition the shank portion 32c within the slot 28f of the new blade.

The invention will be seen to provide a cutting tool assembly of the pilot holder and cutter blade type in which provision is made to allow the cutter blade to self-align in response to misalignment or uneven surface conditions and in which blade replacement is quickly and efficiently accomplished.

Whereas preferred embodiments of the invention have been illustrated and described in detail, it will be apparent that various changes may be made in the disclosed embodiments without departing from the scope or spirit of the invention.

I claim:
1. A cutting tool assembly comprising:
(A) an elongated pilot holder including an upper attachment portion for removable receipt in a chuck, a shank portion below said attachment portion and including a transverse through slot, and a pilot portion below said shank portion, said slot beginning at a location above said pilot portion and extending upwardly to a location below said attachment portion;
(B) a rigid unitary cutter blade adapted to be positioned in said slot in transverse relation to the central axis of said pilot holder and including a central attachment portion having a height as it passes transversely through said slot less than the height of said slot and left and right cutting portions extending transversely from opposite sides of said pilot holder; and
(C) means mounting said blade in said slot for translatory and rotational movement relative to said holder.

2. A cutting tool assembly according to claim 1 wherein:
(E) said mounting means comprises a slot in said blade attachment portion and a transverse pin in said holder passing through said blade slot.

3. A cutting tool assembly according to claim 2 wherein:
(F) said pin is threadably received in said holder and is removable to allow removal and replacement of said blade.

4. A cutting tool assembly according to claim 1 wherein:
(E) said mounting means includes a mounting member movable between a retracted position in which it is clear of said slot to allow removal and insertion of said blade in said slot and a working position in which it mounts said blade in said slot for translatory and rotational movement relative to said holder.

5. A cutting tool assembly comprising:
(A) an elongated pilot holder including an upper attachment portion for removable receipt in a chuck, a shank portion below said attachment portion and including a transverse through slot, and pilot portion below said shank portion;
(B) a cutter blade adapted to be positioned in said slot in transverse relation to the central axis of said pilot holder, said blade including a central attachment portion positioned in said slot and having a height slightly less than the height of said slot, a notch in one side of said attachment portion, and left and right cutting portions extending transversely from opposite sides of said pilot holder; and
(C) a spring loaded axially displaceable pin carried by said pilot holder and including a head portion sized to seat in said notch in said blade, said pin being movable between a retracted position in which it is clear of said slot to allow removal and insertion of said blade in said slot and a working position in which said pin head portion projects into said slot and seats in said notch to mount said blade in said slot for translatory and rotational movement relative to said holder.

6. A cutting tool assembly according to claim 5 wherein:
(H) said notch is in the lower side of said attachment portion of said blade; and
(I) said pin is positioned in said pilot portion and said head portion projects upwardly into said slot in the working position of said pin for seating in said notch.

7. A cutting tool assembly according to claim 6 wherein:
(G) said pilot portion includes a central bore opening at its upper end in said slot and at its lower end in the lower end of said pilot portion; and
(K) said pin comprises a component of a cartridge unit adapted to be positioned in said central bore of said pilot portion with said head portion of said pin projecting upwardly into said slot in the working position of said pin.

8. A cutting tool assembly according to claim 7 wherein:

(L) said cartridge further includes a plug sized to fit in said bore of said pilot portion and including a central bore slidably passing said pin, a coil spring positioned around said pin between said head portion and said plug, and a radially enlarged member secured to the lower end of said pin below said plug to define the limit of upward spring biased movement of said pin in said plug.

9. A cutting tool assembly according to claim 8 wherein:
  (M) said plug is threadably received in said bore of said pilot portion.

10. A cutting tool assembly according to claim 8 wherein:
  (M) said radially enlarged member comprises a knob to facilitate grasping of the lower end of said pin to pull said pin downwardly against the bias of said spring to its retracted position to allow insertion of said cutter blade into said slot and to align said notch with said pin, whereafter said knob may be released to allow said pin head portion to move to its working position seated in said notch and mount said cutter blade in said slot in a manner such that the upper transverse edge of said blade is spring urged against the upper transverse edge of said slot and the blade may pivot and translate in said slot against the yieldable resistance of said spring in response to unevenness in the surface of the part being cut by said cutter assembly or in response to misalignment as between the central axis of said pilot holder and the part surface.

* * * * *